United States Patent
Neal et al.

(10) Patent No.: US 6,871,198 B2
(45) Date of Patent: Mar. 22, 2005

(54) COMPOSING AND CATALOGING ITEM CONFIGURATION DATA

(75) Inventors: Michael Renn Neal, Superior, CO (US); Ian Straub, Broomfield, CO (US); James Michael Wilmsen, Westminster, CO (US)

(73) Assignee: Requisite Technology, Inc., Westminster, CO (US)

( * ) Notice: Subject to any disclaimer, the term of this patent is extended or adjusted under 35 U.S.C. 154(b) by 324 days.

(21) Appl. No.: 10/029,352

(22) Filed: Dec. 21, 2001

(65) Prior Publication Data

US 2003/0149706 A1 Aug. 7, 2003

(51) Int. Cl.⁷ .............................................. G06F 17/30
(52) U.S. Cl. ........................ 707/3; 707/10; 707/104.1; 705/29; 705/53; 709/200
(58) Field of Search ............................. 707/2, 3, 100, 707/200, 104.1, 10; 705/29, 80, 53; 710/38, 100; 709/200

(56) References Cited

U.S. PATENT DOCUMENTS

| | | | |
|---|---|---|---|
| 5,715,444 A | * | 2/1998 | Danish et al. ............... 395/604 |
| 5,740,425 A | | 4/1998 | Povilus |
| 5,802,524 A | * | 9/1998 | Flowers et al. ............. 707/103 |
| 5,890,175 A | * | 3/1999 | Wong et al. ................ 707/505 |
| 5,897,639 A | | 4/1999 | Greef et al. |
| 5,963,953 A | * | 10/1999 | Cram et al. ................. 707/102 |
| 5,983,219 A | | 11/1999 | Danish et al. |
| 6,023,683 A | * | 2/2000 | Johnson et al. ............... 705/26 |
| 6,032,145 A | | 2/2000 | Beall et al. |
| 6,055,516 A | * | 4/2000 | Johnson et al. ............... 705/27 |
| 6,072,481 A | * | 6/2000 | Matsushita et al. ......... 345/326 |
| 6,110,213 A | * | 8/2000 | Vinciarelli et al. ............ 703/1 |
| 6,128,600 A | | 10/2000 | Imamura et al. |
| 6,154,738 A | | 11/2000 | Call |
| 6,163,774 A | | 12/2000 | Lore et al. |
| 6,324,534 B1 | * | 11/2001 | Neal et al. ..................... 707/3 |

FOREIGN PATENT DOCUMENTS

| | | |
|---|---|---|
| EP | 1102189 A2 | 5/2001 |
| WO | WO01/04775 A2 | 7/1999 |
| WO | WO00/79409 A2 | 12/2000 |
| WO | WO01/16796 A2 | 3/2001 |

OTHER PUBLICATIONS

Oliver Kelkar et al.: Price Modeling in Standards for Electronic Product Catalogs Based on XML, May 2002, ACM, pp. 366–375.*

Duen–Ren Liu et al., A framework for Personalized E–Catalogs: an Integration of XML–based Metadata, User Models and Agents, Jan. 2001, IEEE, pp. 1–10.*

PCT Search Report, PCT/US02/41393, Jul. 15, 2003, 4 pages.

* cited by examiner

*Primary Examiner*—Charles Rones
*Assistant Examiner*—Jacques Veillard
(74) *Attorney, Agent, or Firm*—Holland & Hart LLP; Christopher J. Kulish

(57) ABSTRACT

An improvement for composing and cataloging item configuration data is disclosed. One embodiment of the invention includes identifying a base item, identifying a part number for the base item, breaking the part number into sections, each section corresponding to an attribute of the base item, and determining which of the part number sections relate to configurable attributes of the base item. The embodiment further includes listing a plurality of selectable part number section values for the configurable attributes, listing descriptive information for each of the selectable part number section values, linking the descriptive information to the corresponding selectable part number section value, generating a part number formula to define the configurable sections and associate configurable sections to the corresponding list of values, and generating a description formula to define a configurable description and associate descriptive information with corresponding configurable selectable part number values. The embodiment further includes adding the base item part number, values list, descriptive information list, part number formula and description formula to an electronic catalog.

41 Claims, 8 Drawing Sheets

FIG. 3

John Smith Product Search

John Smith Product Search  300 bic pen   (SEARCH) (HINTS)

Search string may include category, part number, manufacturer, description
☐ Include priced products only   ● Table display   ○ Web-style display 304 { ● Show all categories with *bic pen red* or click a category below
      ○ Pens  ○ Pen Refills
306

310   1-10 of 29 Items Matching Search — 312   [View Cart]

302

| Category | MFR NAME | Mfr Part # | | Description | Supp Part # | Price |
|---|---|---|---|---|---|---|
| Pens | Bic Corp | SGSF | Add to Cart | PEN BALLPOINT SGSF SOFTFEEL W/CLIP AND | NIGS32 | 2.36 |
| Pens | Bic Corp | REMBID | Add to Cart | PEN, MICRO ROLLER | NIGB136 | 2.47 |
| Pens | Bic Corp | SCSM11 | Add to Cart | PEN, BALL PT, RTRBL | NIGS36 | 1.85 |
| Pens | Bic Corp | SCSF11 | Add to Cart | PEN, BALL PT, RTRBL | NIGC32 | 3.60 |
| Pens | Bic Corp | 20118 | Add to Cart | PEN BALLPOINT GSM11 BIRO W/CAP & CLIP | NI2032 | 1.73 |
| Pens | Bic Corp | 20128 | Add to Cart | PEN BALLPOINT GSF11 BIRO W/CAP & CLIP | NI2043 | 1.78 |
| Pens | Bic Corp | 10128 | Add to Cart | PEN BALLPOINT MS11 W/CAP & CLIP | NI1018 | 1.82 |
| Pens | Bic Corp | MRC21 | Add to Cart | REFILL, PEN, BALL | NICB21 | 1.12 |
| Pen Refills | Bic Corp | MS11 | Add to Cart | PEN, BALL, STIC | NICB18 | 0.83 |
| Pen Refills | Bic Corp | MRM21 | Add to Cart | REFILL, F/4COLOR PEN | NICB16 | 1.52 |

[NEXT ▲] — 308

COMPOSING AND CATALOGING ITEM CONFIGURATION DATA

BACKGROUND OF THE INVENTION

1. Field of the Invention

The present invention relates to storing, retrieving and organizing items in a database, such as an electronic catalog, using part number formulas. More particularly, the invention relates to relating sections of part number formulas to particular aspects of different configurations of an item and storing, retrieving and organizing the different configurations as variations on a single item.

2. Description of the Related Art

Searchable electronic catalogs are commonly used in support of various electronic commerce and purchasing functions. These catalogs typically have a user interface for selectively retrieving and displaying records as well as a system for electronically purchasing any items that are selected. Some items that may be cataloged are available in a variety of different configurations and each configuration will often have a unique part number. For example, a particular type of pen may be available with different colors and points. A garment may be available in different sizes, fabrics and colors. A power supply may be available with different input and output voltages, current capabilities, and housings. If all the configurations of an item are each listed as separate items, then the catalog can become cumbersome. Finding and selecting items and managing the catalog can be more difficult. On the other hand, if the different configurations are ignored, then details about the item and complete part numbers may be unavailable for each configuration.

Pens and shirts represent simple examples of products with a variety of available configurations. In some product domains, there may be thousands or even millions of different possible configurations. A lighting fixture, for example, may be offered with choices of lamps, starting circuits, lamp wattages, ballasts, input voltages, housings, lenses, mounting brackets, finishes, fuses and certifications. When represented as thousands of different items, one for each configuration, such complicated configurable items become almost impossible to search, load, extract and add to an electronic catalog shopping cart because of the very large number of combinations that must be handled. Sifting through the thousands of possibilities can be very time consuming and confusing for a purchaser.

In relational databases, such items have been handled by coding long sequences of conditional branch instructions, typically in the form of "if, then" statements. The hard-coded configurations, while usable, can only be changed by an expert in the conditional logic system using a map of the "if, then" sequence for the particular product. In addition, the hard-coded configurations are difficult to translate across platforms to populate catalogs that operate using different software or architectures. Updates and translations are particularly important because the options in such configurable products often are changed. For the example of a particular pen, an additional color choice may be added at any time. For the lighting fixture, mentioned above, it would be common for an option in lamp wattage to be added or taken away as the available lamps change. As a result, neither a long list of thousands of separate items nor complex hard-coded configuration logic is satisfactory for a category that is easy to use, reconfigure, update, and transport across platforms.

BRIEF SUMMARY OF THE INVENTION

An improvement for composing and cataloging item configuration data is disclosed. One embodiment of the invention includes identifying a base item, identifying a part number for the base item, breaking the part number into sections, each section corresponding to an attribute of the base item, and determining which of the part number sections relate to configurable attributes of the base item. The embodiment further includes listing a plurality of selectable part number section values for the configurable attributes, listing descriptive information for each of the selectable part number section values, linking the descriptive information to the corresponding selectable part number section value, generating a part number formula to define the configurable sections and associate configurable sections to the corresponding list of values, and generating a description formula to define a configurable description and associate descriptive information with corresponding configurable selectable part number values. The embodiment further includes adding the base item part number, values list, descriptive information list, part number formula and description formula to an electronic catalog.

BRIEF DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

FIG. 3 is a representative display of search results for an electronic catalog system in which items are displayed in a basic form;

DETAILED DESCRIPTION OF THE INVENTION

I

Figure 1:
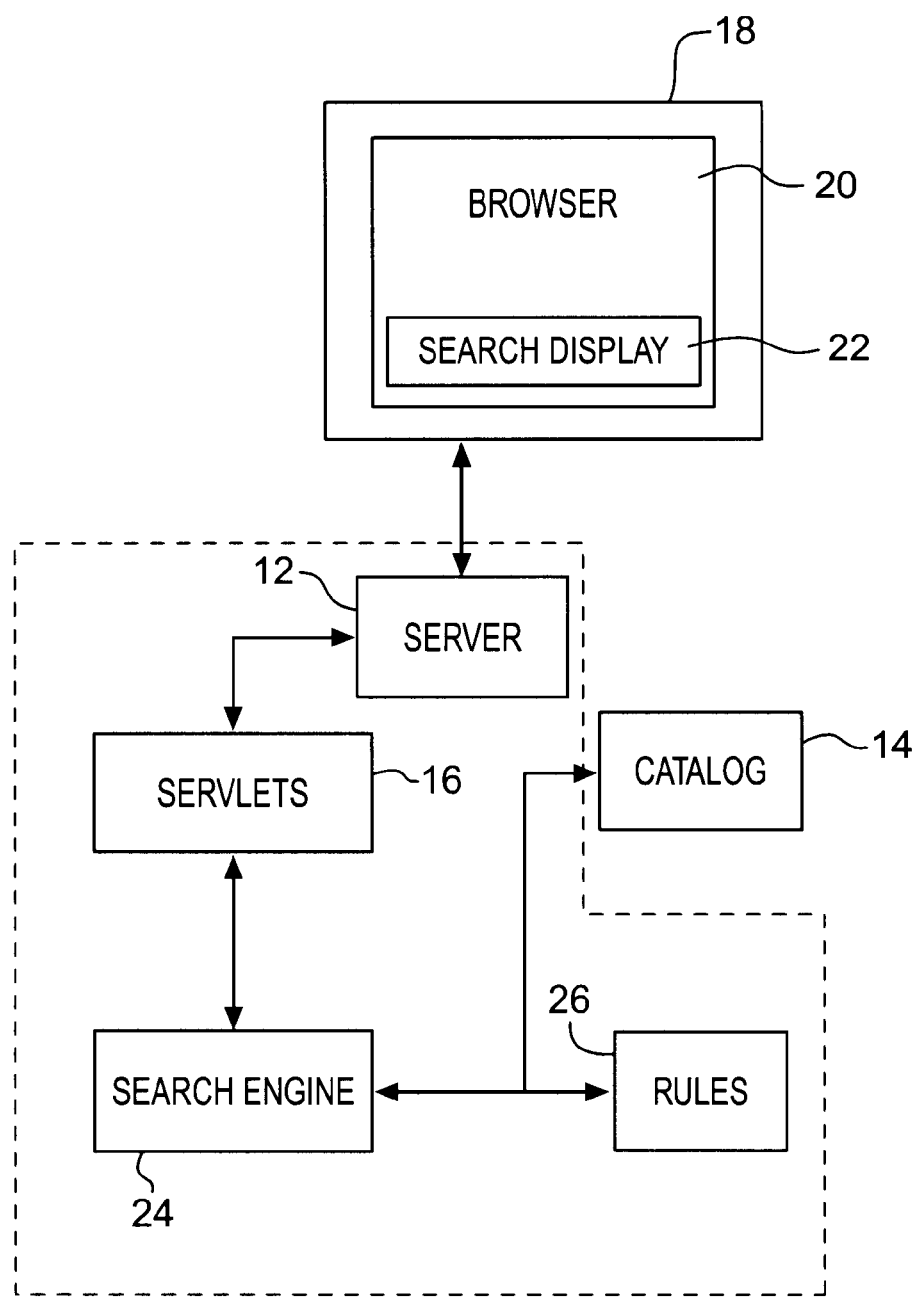
FIG. 1 is a block diagram representation of an electronic catalog system suitable for use in implementing the present invention.

FIG. 1 is a functional block diagram representation of an electronic catalog and automated purchase requisition system. An application server 12 is connected to interact with a database 14 in the form of an electronic catalog which resides in a computer memory storage device at the server or at another device. The catalog can be integrated with the server, co-located with the server or connected using a local or wide area network connection. Users of the system have workstations or clients 18 that are connected to the application server 12 through a local or wide area network such as the Internet or an intranet. The client includes a browser 20 such as a common Internet web browser or dedicated software through which the workstation communicates with the server 12 to render a search display 22. Commands entered into the web browser software can cause information to be extracted from the database 14 and displayed at the workstation 18 in the search display or in some other display. While the invention will be described in terms of browsers communicating using typical web interfaces such as HTTP (Hyper Text Transfer Protocol) and Java instructions, the present invention does not rely on any particular platform or interface. The invention can use web-type browser software or software that has been developed specifically for the purposes of the present invention with unique code, interfaces and display technologies. The invention can be implemented on a single machine or with any kind of distributed processing environment from mainframes with dumb terminals to wireless servers with mobile radio PDAs (Personal Digital Assistant).

The database 14 is an electronic catalog of items, such as products or services. The database 14 can be constructed using a uniform catalog schema so that each product has a single database record that includes all of its different suppliers. However, multiple catalogs, one or more for each supplier, or an aggregated catalog, an aggregate of product information from multiple suppliers, can also be used. In the aggregated catalog, the same item may be listed several times in inconsistent ways.

In one embodiment of the invention, the server 12 uses servlets 16 to operate a search engine 24 that accesses one or more electronic catalogs 14. The search engine is a common and useful application of the present invention, however the present invention can be used whenever records are retrieved from the catalog. It can be used to generate a catalog to be published whether to a marketplace, a purchaser or a seller. It can also be used for any direct product purchase and for any other use of catalog records, such as system administration, management and quality control.

In the search engine example, the application server 12 queries the database 14 through the search engine and directs the results to the workstation 18. The type or format of the catalog is irrelevant as long as the catalog will respond appropriately to a query from the search engine 24. For example, the catalog may reside within a relational database or may reside within an object-oriented database. The catalog can be stored on a disk drive, a tape drive, RAM, or any other computer data storage devices. The application server 12 may reside in a computer attached directly to the storage device, or alternatively may be connected to the storage device 16 through a network. In one embodiment, the servlets are based on Java APIs (Application Program Interface) and JavaScript/HTML (Hyper Text Markup Language) Interface Generation. These use JDBC (Java Database Connectivity) to communicate through the search engine to a separate data store where the catalog resides. The JDBC protocol allows the search engine to communicate with a catalog based on a variety of different commonly used databases including those available from Oracle Corp., Microsoft Corp., and SAP AG.

The search engine 24 is also connected to a rules store 26 through similar Java or HTTP-type protocols. The rules store contains rules that are used to configure, modify or present data that has been requested by the user. As an alternative to the rules store, the rules can be incorporated into the catalog. In one embodiment, the catalog is maintained and loaded in the form of XML (Extensible Markup Language) statements and these statements can include values for attributes of catalog items or rules about how to determine values of catalog items. Other types of markup languages, such as SGML (Standard Generalized Markup Language) and HTML (Hyper Text Markup Language) can be used as can other types of database formats.

II

Figure 2:
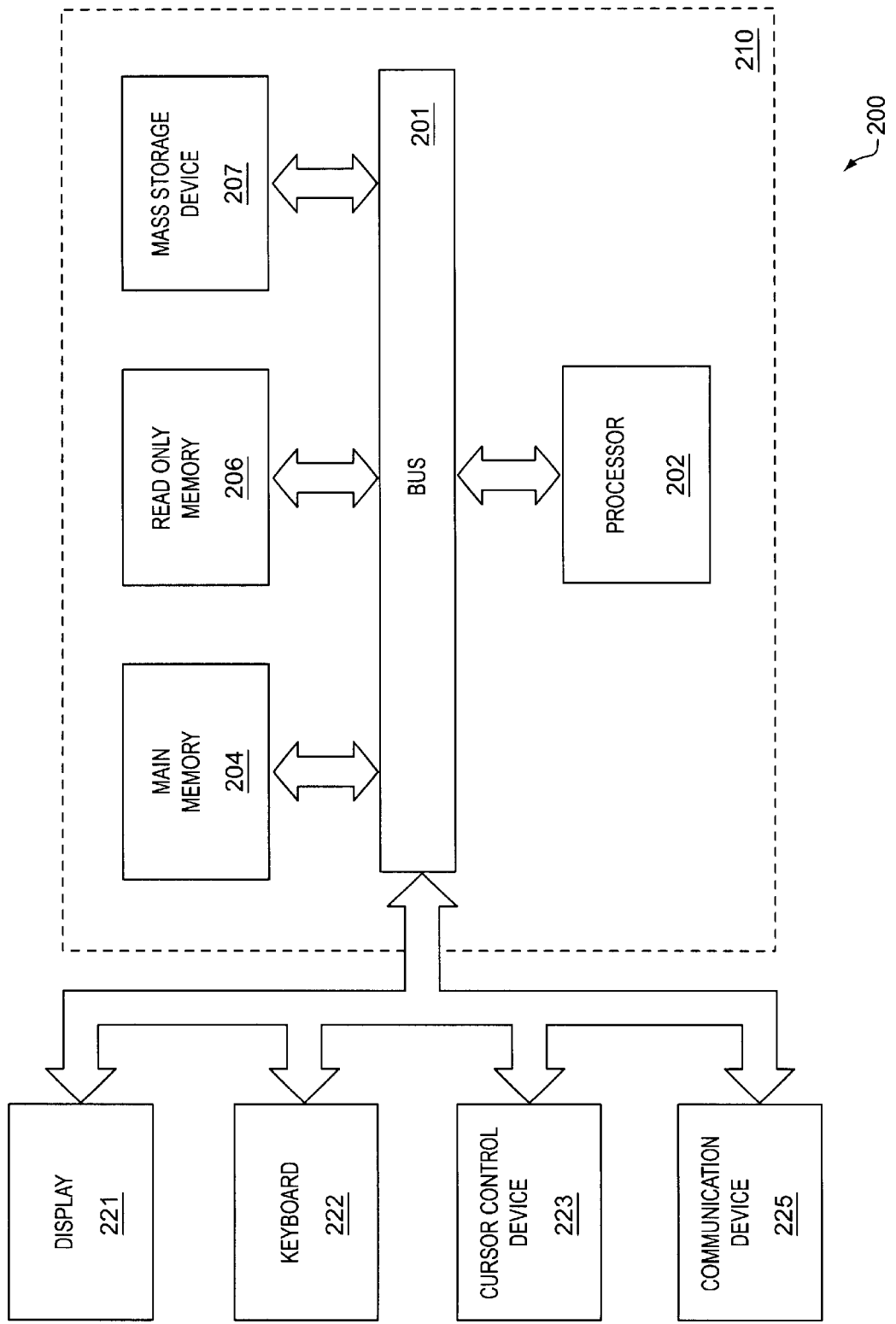
FIG. 2 is a representative example of a computer system suitable for implementing the present invention.

A computer system 200 representing an example of a system upon which features of the present invention may be implemented is shown in FIG. 2. The workstation, search engine, servers, and databases of FIG. 1 will typically be configured similar to what is shown in FIG. 2. Each of these components can be provided using its own computer system or several different components can be combined. For example, the search engine, server, rules, and catalog can all be provided using a single computer system. The computer system can be deployed on a single platform as shown, or different components can be provided on separate platforms so that the bus 201 connects several different platforms together containing different portions or aspects of the mass storage 207 and other system 210 components. The computer system can also be implemented in one or more small portable platforms such as laptops and PDAs. The computer system 200 includes a bus or other communication means 201 for communicating information, and a processing means such as a microprocessor 202 coupled with the bus 201 for processing information. The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor.

The computer system may also include a nonvolatile memory 206, such as a read only memory (ROM) or other static data storage device coupled to the bus for storing static information and instructions for the processor. A mass memory 207 such as a magnetic disk or optical disc and its corresponding drive may also be coupled to the bus of the computer system for storing information and instructions such as the various databases.

The computer system can also be coupled via the bus to a display device or monitor 221, such as a cathode ray tube (CRT) or Liquid Crystal Display (LCD), for displaying information to a user. For example, graphical and textual indications of installation status, operations status and other information may be presented to the user on the display device. Typically, an alphanumeric input device 222, such as a keyboard with alphanumeric, function and other keys, may be coupled to the bus for communicating information and command selections to the processor. A cursor control input device 223, such as a mouse, a trackball, or cursor direction keys can be coupled to the bus for communicating direction information and command selections to the processor and to control cursor movement on the display 221.

A communication device 225 is also coupled to the bus 201. The communication device 225 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example. Source Content and the databases can be made available to the computer system in this way.

It is to be appreciated that a lesser or more equipped computer system than the example described above may be preferred for certain implementations. Therefore, the configuration of the exemplary computer system 200 will vary from implementation to implementation depending upon numerous factors, such as price constraints, performance requirements, technological improvements, or other circumstances.

III

The search engine 24 is activated by the application server 12 in response to inputs from the workstation's web browser. The search engine follows an algorithm, for example the algorithm described in U.S. Pat. No. 6,032,145, the disclosure of which is incorporated fully by reference herein, to search through the catalog for any items related to the query. The algorithm in the above-mentioned patent applies a cascading sequence of progressively broader searches in order to locate records in the catalog. This provides a significantly greater probability that a desired item will be found. However, any other type of search algorithm can be used. A proximity query, for example, is offered in some well known commercial databases, such as those from Oracle Corp.

In the present application, the search can be a broad search based on any characteristic of an item generally, for example, a search for a Bic brand pen. Alternatively, the search can be very specific for a single item, such as Bic part number SCSM11. In either case, the user inputs a search string to the web browser guided by the search display 22 as shown in FIG. 2. The search string can be free-form or subject to specific structural rules. The particular format of the search algorithm and the input string is not important to the present invention. The search string may comprise search terms in any order. For example, the search string can include the name of an item, a part number for an item, or any descriptive attribute of the item. The search engine can be designed to handle misspellings, word fragments, or any other string that may lead a user to find the desired product within the database 14.

An example of a search display 22 is shown in FIG. 3. This display already includes the results of the search, in this case a list of pens from Bic Corp. The display, in this example, has a single text box 300 for search strings located in the upper-left corner of the display. The example search string in box 300 is "bic pen" which represents a combination of sought for values from the fields of manufacturer name, classification, and description. Alternatively, there may be separate text boxes for different parts of the search strings. The single box can be simpler to use. The display has several other areas of information, as shown in FIG. 3. The search results or list of identified items is shown in a display list 302. The display list 302 includes the category, the manufacturer name, the manufacturer part number, a description, a supplier part number and a price. For each of these fields, values are shown for each item or record, including supplier part number and price.

A compilation of each unique category of product, compiled from the list of the identified items, is shown in a category display area 304. If several different categories of products were found during the search, then each category will be displayed along with a corresponding CATEGORY radio button 306. The user can narrow the list by selecting one of the categories. For example, FIG. 3 shows that two different categories of items were found: pens and pen refills. Since there are 29 matching items (only the first 10 are shown), the selection of the PENS category radio button 306 will narrow the list to include only pens and not pen refills. A new display will be generated in which the display list includes only items in the pens category and not in the pen refills category. If the desired item from the catalog is not immediately visible in the display, the user has the option of paging through the remaining items in the list by clicking on a NEXT button 308. If the desired item is found, no further searching is required.

A further alternative is to select only items having a particular manufacturer. The search display also includes a MANUFACTURER (Mfr Name) button 310. This can be used to invoke a screen containing a list of all manufacturers of the products shown in the display list 302. Selecting one of the manufacturers will cause the server 12 to narrow the display list 302 to include only items from the selected manufacturer. The user can also use information in the display to submit a new query to further limit the results. For example a query for "bic pen red fine" will return a shorter list of items.

One way to generate the display of FIG. 3 is for the user to enter a query into a browser or dedicated catalog application. The search query is sent over a network, such as the Internet or an intranet, by the client 18 from the browser 20 to the application server 12 using, e.g. HTTP. The application server 12, upon receiving the query parses the HTML packet as appropriate for the search engine 24. It also determines the identity of the user based on embedded ID codes, the packet source or some other approach. The search engine can perform any one or more types of queries using the search string to find a match for the search string within the database 14. Typically, the search string within the HTML packet is compared to the catalog text that is identified as attribute values of each item. If no record is identified in response to the query, then the application server builds a results display by compiling the information into an HTML package that can be displayed within the browser to show the user that no records have been found. This display is sent back over the network using, e.g. HTTP to the workstation browser where it is displayed as a web page or a window to the user in the search display 22. The user can then try another query, try another catalog etc.

If a record is identified, then the search engine can retrieve the values of the attributes for the identified records from the catalog. As discussed above, FIG. 3 shows an example of some catalog records with attributes and values displayed. The attributes as displayed are category, manufacturer name, manufacturer part number, Description, Supplier Part number, and Price. These attributes have been selected as examples, but many other attributes can be included in the catalog. In addition to the global attributes, such as the ones shown, that apply to all types of items, the catalog is likely to have local attributes that apply only to certain kinds of items. Local attributes can be such things as ink color, voltage, fuel capacity etc. The items each have values for each attribute as shown in the display list 302. For example, category has values of pens and pen refills. Manufacturer part number is shown with values of SGSF, REMBID, SCSM11, etc. These values are stored and maintained in the catalog from which they have been retrieved.

IV

In the case of the first listed pen, the displayed manufacturer part number SGSF represents only a portion of the complete manufacturer part number. The complete number includes two further sections, one for color and one for the fineness of the point. A complete number might be SGSF-RED FINE. Another part number might be SGSF-GRN MEDM. As mentioned above, it is entirely possible to list every variation in color and point fineness as a separate item. This can result in many more items in the catalog however. If the pens are available in four alternative colors and three alternative finenesses, that would result in twelve different possible pen configurations. The twelve listings, if available for each of the 29 different matching items in the display of FIG. 3, also make it harder for a user to find a product. The twelve different possible combinations for the SGSF pen are listed below in Table 1. These combinations are provided as examples only. The actual Bic product upon which this example is based may or may not be available in all of these configurations. The product may also be discontinued at present.

TABLE 1

| Mfr Name | Mfr Part No. | Description | Point | Ink Color | Price |
| --- | --- | --- | --- | --- | --- |
| Bic | SGSF-FINE BLK | Ballpoint Pen Soft-Feel w/clip | Fine Point | Black | 0.55 |
| Bic | SGSF-FINE BLU | Ballpoint Pen Soft-Feel w/clip | Fine Point | Blue | 0.60 |
| Bic | SGSF-FINE GRN | Ballpoint Pen Soft-Feel w/clip | Fine Point | Green | 0.55 |
| Bic | SGSF-FINE RED | Ballpoint Pen Soft-Feel w/clip | Fine Point | Red | 0.55 |
| Bic | SGSF-MEDM BLK | Ballpoint Pen Soft-Feel w/clip | Medium Point | Black | 0.55 |
| Bic | SGSF-MEDM BLU | Ballpoint Pen Soft-Feel w/clip | Medium Point | Blue | 0.60 |
| Bic | SGSF-MEDM GRN | Ballpoint Pen Soft-Feel w/clip | Medium Point | Green | 0.55 |
| Bic | SGSF-MEDM RED | Ballpoint Pen Soft-Feel w/clip | Medium Point | Red | 0.55 |
| Bic | SGSF-BOLD BLK | Ballpoint Pen Soft-Feel w/clip | Bold Point | Black | 0.78 |
| Bic | SGSF-BOLD BLU | Ballpoint Pen Soft-Feel w/clip | Bold Point | Blue | 0.83 |
| Bic | SGSF-BOLD GRN | Ballpoint Pen Soft-Feel w/clip | Bold Point | Green | 0.78 |
| Bic | SGSF-BOLD RED | Ballpoint Pen Soft-Feel w/clip | Bold Point | Red | 0.78 |

Many other products are also available in a variety of different configurations. Consider an example of clothing. A particular men's shirt might be available in a range of collar sizes, sleeve lengths, colors and fabrics. When all possible combinations of the four different parameters are listed in a catalog, the number of items can make it difficult to find any other items . Typical US men's shirt sizes offer nine collar sizes, from 14 to 18 with half sizes, and six sleeve lengths, from 30–35. If five colors and three fabrics are available, then the one style of shirt may include 810 items. Similar examples may be found with power supplies and voltage controllers or with modular furniture sets, for example.

So that all the variations can be offered in a single concise listing, the pen or the shirt or the power supply can be listed just once as a single configurable item. The variations in color, size, capacity, voltage, housings etc. can be displayed if the user wants to investigate those possibilities. This allows the listings of items responsive to a search to be made much more concise, such as the one shown in FIG. 3. An alternative concise listing for the pen of Table 1, is provided below in Table 2. In Table 2, the different point finenesses and ink colors are shown as options on a single item. The part number detail has been reduced to just the generic or common portion of the part number. The portion in Table 1 that describes the options is not shown, however, it can be if desired.

regarded as a different item than a medium point pen or it can be regarded as a variation on the same pen. Similarly, a shirt with the same design but a different fabric may be regarded as a different shirt just as a short sleeve version of a shirt may be regarded as a different shirt from a long sleeve shirt. It is entirely possible that different manufacturers associate products and part numbers differently. While one manufacturer may treat fine point and medium point pens as the same item, another may treat them as different items. In the described embodiment, manufacturer part numbers are used as a guide, regardless of any inconsistencies among manufacturers. As an alternative, supplier part numbers or any other part number source can be used. In another embodiment, an organized structure can be created just for the catalog so that competing items from different manufacturers are treated the same way, notwithstanding the manufacturer's part numbers. This external structure can be imposed to replace any manufacturer or supplier part number scheme with a separate catalog or reference number.

As can be seen from the pen example above, the part number can be parsed fairly easily and a meaning to each component of the part number can be attached. The part number of one pen was SGSF-RED-FINE. The part number has three sections. The first SGSF identifies the structure of the pen and can be associated with descriptive attributes such as pen, ballpoint, soft-feel, with clip. The second section identifies the ink color of the pen as red and the third section identifies the ballpoint as being fine. To catalog this item, the cataloger can rather easily create a matrix such as the one shown in Table 3. Using this table, a part number can be built up for any of the 12 different possible alternative configurations that can be offered based on the SGSF base item. Table 3 shows the designator for each part number section, the order in which it appears in the part number, the

TABLE 2

| Mfr Name | Mfr Part No. | Description | Point Options | Ink Color Options | Prices |
| --- | --- | --- | --- | --- | --- |
| Bic | SGSF- | Ballpoint Pen Soft-Feel w/clip | Fine Point, Medium Point, Bold Point | Black, Green, Blue, Red | 0.55, 0.60, 0.78, 0.83 |

In one embodiment, the decision as to how many different items to show at this first highest level tier is based on part numbers. The example pen of Tables 1 and 2 lends itself very well to being organized around the manufacturer's own part number. However, the manufacturer's or supplier's part numbers need not serve as a guide. A fine point pen can be structure of the part number section and all possible alternative values. The structure is shown as the number of alphabetic characters and the connecting symbol in this case a hyphen or a space. Some part numbers have no connectors and use numbers, letters and other symbols usually in some consistent pattern.

TABLE 3

| Base Section | Color Section | Point Section |
|---|---|---|
| 4 alpha, hyphen<br>SGSF | 3 alpha, space<br>BLK<br>BLU<br>GRN<br>RED | 4 alpha<br>FINE<br>MEDM<br>BOLD |

From Table 3, the cataloger can identify a base item, the Bic SGSF pen. The base item can be configured with ink color and point selections. The base item can be set as having no color or fineness or a particular attribute value can be selected as the base value. For example, the base item can be defined as the SGSF-BLK MEDM pen. The last two attributes, color and point are configurable for the base item, i.e. they can be changed, while the first attribute corresponding to the first section of the part number, SGSF, is not configurable and can not be changed.

Table 3 also provides a part number formula in the second row from which all the configurations can be derived. In this case, a part number formula can be defined as SGSF-Ink Color_CODE Point Fineness_CODE. The structure and format for the Ink Color_CODE is provided above as three alphabetic characters. Using this formula and the values provided in the table, a part number can be generated. Ink Color_CODE, as can be seen above, can have values of BLK, BLU, GRN, and RED, while Point Fineness_CODE can have values of FINE, MEDM, and BOLD. The part number can then be used for ordering, inventory, and fulfillment purposes. Using the formula and values, the part number matrix in Table 3 can be rendered in a text form, such as XML, as shown below.

As described above, pens are found in the catalog based on a search for the attributes of the pen that is desired, such as "bic pen." In order to allow all of the characteristics of the pens to be searched, the description values for each of the variations can be made searchable. In the structure of the catalog described herein, this means that descriptive terms for each variation are added to data records that are accessible to the search engine, for example through a search index. In particular, the pen of Table 1 will have at least three sets of descriptive terms, one set for each part number section.

Items can be viewed as having two tiers of attributes. The first tier of descriptive terms can be called global attributes. These are qualities that are shared by every item in the catalog, such as manufacturer, supplier, price, quantity per package, delivery time, availability, etc. The global attributes can typically be associated with the base section of the part number. The pen will also have attributes that are unique to pens or unique to pens and a few other types of items that are like pens, such as ink color and fineness. The local attributes will often depend, in part, upon the other sections of the part number, the sections corresponding to the configurable aspects of the item. These descriptive terms can be rendered in an options matrix as shown in Table 4. Table 4 provides the codes for each part number section with the corresponding description and price adjustment for each option. It also indicates whether the descriptions will be made available to the search index. Typically, this determines whether the descriptions will be compiled into the catalog's search index when the catalog is being compiled. In one embodiment all the part number matrices are maintained as XML documents. When the XML is loaded into the catalog, the loader looks for flags to indicate which items are to be added to the search index and which items are not.

TABLE 4

| Color Section<br>Part No. | Description<br>(ink color) | Description<br>Searchable | Price Adjustment |
|---|---|---|---|
| BLK | black | yes | 0 |
| BLU | blue | yes | 0 |
| GRN | green | yes | 0.05 |
| RED | red | yes | 0 |
| Point Section<br>Part No. | Description<br>(point) | Description<br>Searchable | Price Adjustment |
| FINE | fine point | yes | 0 |
| MEDM | medium point | yes | 0 |
| BOLD | bold point | yes | 0.23 |

In addition to the part number formula described above, a description formula can be defined from Table 4 as pen, ballpoint, soft-feel, with clip, Ink Color_DESC, Point Fineness_DESC. The last two descriptive terms are taken from the table depending upon which selections have been made. Table 4 shows that Ink Color_DESC can have values of black, blue, green, and red. Point Fineness_DESC can have values of fine point, medium point, and bold point. These values can be linked to the Ink Color_CODE and Point Fineness_CODE as shown in Table 4 using, for example a mark-up language. As result, the description formula can provide a description of any configured item based on the base item, SGSF or SGSF-BLK-MEDM.

The matrix need not be limited to single word descriptions or even to single descriptions. Different sets of descriptions can be defined and selected based on a user identification. For example, a highly technical user may desire a more detailed set of descriptions than another user. Using two sets of descriptions, and checking the user preferences or authorization, the appropriate set of descriptions can be selected for display to the user. Another example of multiple descriptions sets is to accommodate different languages. While the same pens may be sold under the same part numbers in different countries, purchasers may prefer descriptions in different languages. Accordingly, a second set of color descriptions can be added to the matrix, for example, negro, azul, verde, rojo. By indicating a language preference, the user can be provided with descriptions in the appropriate language to the extent that the descriptions are available. This allows for multilingual catalogs with very little repetition in subject matter. It also allows the catalog to easily be modified in all languages at the same time Table 4 also has a price column for each configurable option. These options are expressed in terms of amounts that are to be added to the base item price. However, they can be expressed in any other way that allows the differences in price between different configurations to be determined. Percent increases and multipliers can be used as price factors for example. The price column provides enough information to define a price formula. The price formula can be+Ink Color_PRICE+Point Fineness_PRICE. So for example, the green fine point pen costs 5 cents more than the base item, the black medium point pen. The green, bold point pen costs 28 cents more. The price factors can also be expressed as text and linked to the appropriate configurable options using a mark-up language as discussed above. In the example above, the mathematical operators are plus signs. Subtraction can be accomplished by price codes preceded by a minus sign. The formula may also include other mathematical functions such as subtraction, multiplication and division. While the mathematical operators (plus signs) are defined by the price formula in the example above, they can instead be a part of the price values in the matrix. In that case, the formula is used to refer to the appropriate values and determine the ordering while the mathematical function to be applied comes from the matrix.

The price formula and matrix approach can be used for a wide variety of different price adjustments. Any attribute value with a price impact can be linked to a price adjustment. These attributes can include precision grades, tolerances, warranty levels, shipping alternatives, rush delivery options, installation alternatives, and more. One common factor that influences product pricing is the purchased quantity. Many vendors offer volume discounts. Such discounts can also be accommodated using the matrix approach described above. Cable may have one price if purchased by the meter and another price if purchased by the tens of meters or the kilometer. Pens, as discussed above may be sold independently, in boxes of 12 or in cases of 24 boxes. This can be expressed in a matrix as well or be made part of the matrix shown in Table 4. The shipping or package units may be a part of the part number or it may be a separate descriptive element. In either event, the quantity or shipping unit choices can be added to the matrix and the price formula. It can then be configured in the same way as the ink color as shown, for example, in FIG. 4. An example of a matrix for packing units is shown in Table 5. The price formula can be rewritten as+Ink Color PRICE+Point Fineness PRICE+Package Units PRICE. Similar changes can be made to the part number and description formulas.

TABLE 5

| Package Units. | Description | Price Adjustment |
|---|---|---|
| EA | each | 0 |
| BX | box of 12 | 10 |
| CS | case of 24 boxes (288) | 100 |
| RC | box of 12 (recycled) | −40 |

Volume discounts do not require unique packaging such as boxes and cases or 50 m reels and 500 m reels. In terms of the matrix and the pricing formula, a box of 24 and a quantity of 24 can be treated in the same way. The buyer can be informed whether 12 individual units or a box will be shipped using the description.

In addition, the matrix and formulas are not limited to any type of actual part number. Additional descriptors can be attached to the part number using the same principles discussed above. For the pens example, the manufacturer's part number may include the package units. After configuration, the part number can look like SGSF-RED BOLD BX. It is also possible that the package unit is not a part of the manufacturer's part number at all. In either event, the part number formula can be structured to configure a unique product identifier that is understandable to the supplier. The part number formula can also render an expression such as Box SGSF-RED BOLD. Alternatively, the part number may be SGSF-MEDM. The ink color, which must also be specified can be treated in the same way as a part number section but not added to the part number. The green, medium point pen can be ordered using the part number and color as SGSF-MEDM, green, case. In this case, the ink color codes and ink color descriptive information can be the same.

Similarly, shirts often use a part number to identify a style and perhaps a color but not the size. For these items, the size must be specified in order to uniquely identify the product but the size is not a part of the part number, it is an additional element. These additional elements, whether they relate to size, color, power ratings or any other aspect of the item can be treated in the same way as described above using the type of matrix shown. The matrix will still be able to construct an item number that uniquely identifies an item including any constraints or selections that are not part of the part number using the same principles applied above. A shirt may be identified, for example, using a part number formula, such as A721-RED XL.

In the embodiments described above in which the search engine searches the descriptive terms of each item to find a match, the description values from the table for these local attributes can be provided to the search engine. If this is done, then the search for "bic pen red" will find and display, the SGSF pen. On the other hand, a search for "bic pen purple" or "bic pen extrafine", will not find the SGSF pen. Each matrix within the part number in the example above, for example, the ink color matrix and the point fineness matrix, relates to a particular attribute of the pen. The search engine access for each matrix and therefore each attribute can be specified independently for each matrix using, for example, metadata statements linked to the descriptive terms.

V

As can be seen from FIG. 3, not all of the information regarding the SGSF pen, or probably any of the other pens is displayed. The displayed information is also not enough to allow the product to be ordered because the color and point need to be specified. While it is possible for the user's selection to be inferred based on a customer profile or previous behavior, the present invention allows the user to see the options and make a choice.

Figure 4:
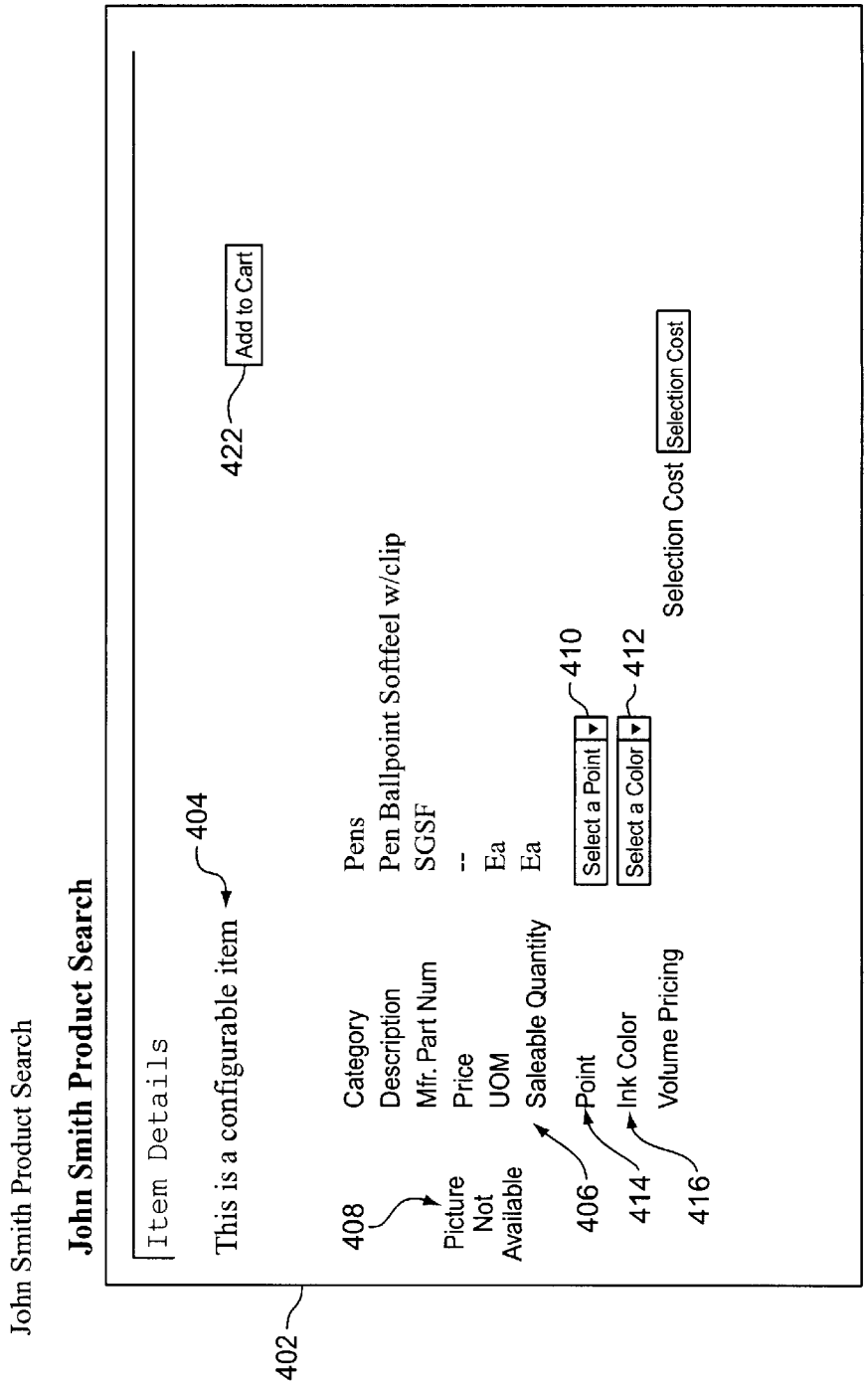
FIG. 4 is a representative display of the configurable details of a selected item.

Upon selecting the "View Cart" button 312 or the SGSF pen item, more details of the SGSF pen can be displayed. This is shown in FIG. 4, an example of a web browser display 402 according to one embodiment of the invention. FIG. 4 provides the user with a summary of information about the selected product, in this case, the SGSF pen. An item type legend 404 informs the user that the item is configurable. A description section 406 provides the category, description, Manufacturer part number, price, units of measure and saleable quantity for the selected item. A frame 408 for an illustration of the item, such as a photo is also provided, when one is available in the catalog. Using this display, the user can configure the selected item and automatically build the part number.

The display 402 provides two drop-down menus or pick lists 410, 412 for configuring the point size and color of the pen, respectively. The windows are placed next to the corresponding header 414, 416 for the respective configurable item. They are identified with instructions in the windows to "select a point" and "select a color." A selection cost window 418 provides any additional costs associated with any selection after the selection has been made. In this example, the user selects a color by typing the name of the desired color in the window 412 with the words "select a color". Alternatively, the arrow next to the window can be selected to produce a pick list 420 as shown in FIG. 5.

Figure 5:
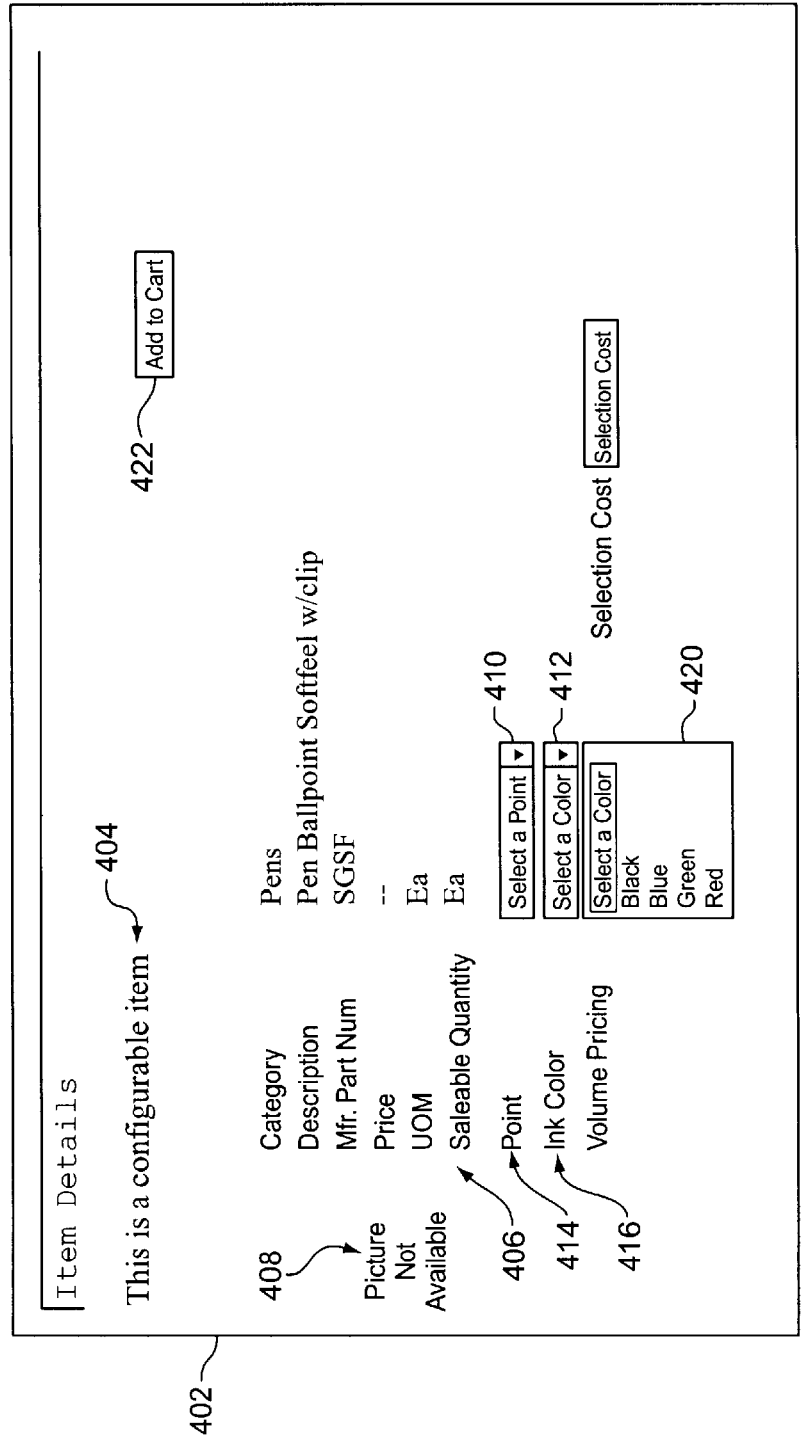
FIG. 5 is a representative display of the item of FIG. 4 in which the ink color of the item can be selected in accordance with the present invention.

In FIG. 5, the display is unchanged except that the ink color can be configured. The color choices in the pick list are the same as those in Tables 1 and 2. The pick list can be generated from a table or matrix in the electronic catalog or from a list of choices defined in a mark-up language and tied to the Ink Color attribute From the displayed pick list, the user can select the desired color. This color is plugged into the part number formula, description formula and pricing formula.

Figure 6:
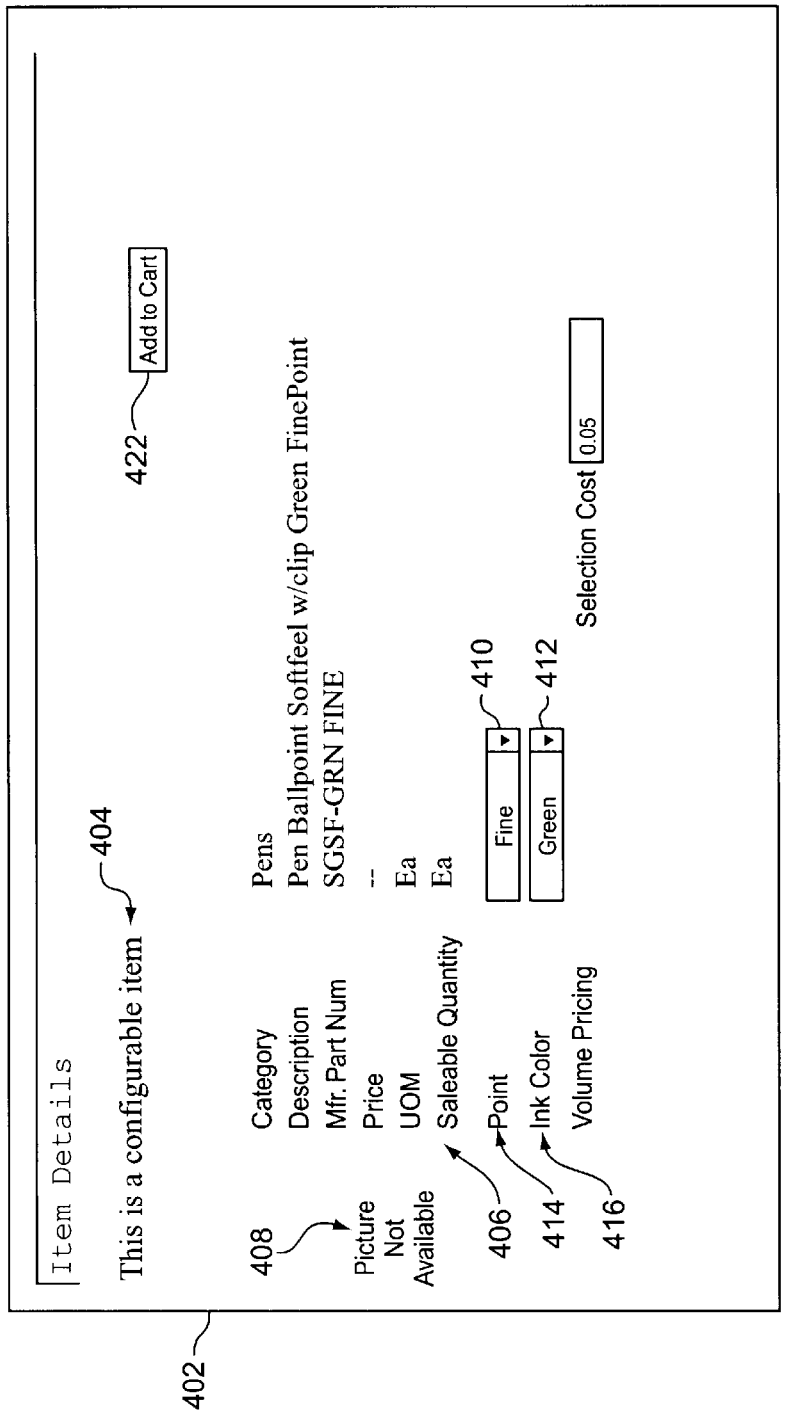
FIG. 6 is a representative display of the item of FIG. 4 in which the configurable aspects of the item have been selected in accordance with the present invention.

The point can be selected in the same way as the ink color. After making the selections, the browser display can indicate both choices as shown in FIG. 6. FIG. 6 also shows that, with both choices made, the manufacturer part number and selection cost can also be assembled, computed and displayed using, for example, the formulas described above. The part number for the configured item is shown as SGSF-GRN FINE. The description for the configured item is shown as Pen, Ballpoint, Soft-Feel, with clip, Green, Fine Point. The selection cost is shown as 0.05. In the illustrated embodiment, the selection cost window is used to show the additional cost of a particular selected configurable attribute, in this case 5 cents for green ink. Alternatively, it can be used to show the actual price or discounted price for the item. In either case, a matrix, table or text file can be used. The price formula mentioned above can be used to calculate the eventual price.

Having configured the item, the user can then select the "Add to Cart" button to purchase the configured item. FIGS. 4, 5, and 6 show a particular way to configure the item using a graphical user interface that is presently in common use. Other existing or future types of displays and selection interface tools, whether graphical or not, can also be adapted to accomplish the same functions as the interface described. The selection of a particular interface will depend on the application of the present invention and the desires of the developer. The illustrated example allows the user to know which choices are available, enter a choice and see the results.

The following XML document shows an implementation of the principles of the invention to render the SGSF pen of Table 1 as a configurable catalog item in XML. The same principles can be applied to render any other items regardless of the number of configurable features. The text below can be rendered into the browser display screens using Java applets or any one of a variety of other tools.

```
<CATALOG xml:lang="en-US">
<DATA>
    <ITEM>
        <OWNER>
            <NAME>Ballpoint Pen Soft-Feel w/clip</NAME>
            <KEY>Pens</KEY>
        </OWNER>
        <KEYVALUE>
            <KEY>Description</KEY>
            <VALUE>This is a configurable item.</VALUE>
        </KEYVALUE>
        <KEYVALUE>
            <KEY>Mfr Part Num</KEY>
            <VALUE>SGSF-BLK MED</VALUE>
        </KEYVALUE>
        <KEYVALUE>
            <KEY>Long Description</KEY>
            <VALUE>pen, ballpoint, soft-feel, with clip</VALUE>
        </KEYVALUE>
        <KEYVALUE>
            <KEY>Price</KEY>
            <VALUE>0.55</VALUE>
        </KEYVALUE>
        <KEYVALUE>
            <KEY>Mfr Name</KEY>
            <VALUE>Bic Corp.</VALUE>
        </KEYVALUE>
        <KEYVALUE>
            <KEY>Sup Part Num</KEY>
            <VALUE>NIGS32</VALUE>
        </KEYVALUE>
        <KEYVALUE>
            <KEY>Sup Name</KEY>
            <VALUE>Office Supply House</VALUE>
        </KEYVALUE>
        <KEYVALUE>
            <KEY>UOM</KEY>
            <VALUE>EA</VALUE>
        </KEYVALUE>
        <KEYVALUE>
            <KEY>Saleable Quantity</KEY>
            <VALUE>Each</VALUE>
        </KEYVALUE>
    </ITEM>
    <MATRIX MATRIXID="14054a3dc1">
        <MATRIXATTRIBUTE key="pens">
            <KEYVALUE>
                <KEY>SEARCHABLE</KEY>
                <VALUE>true</VALUE>
            </KEYVALUE>
            <KEYVALUE>
```

-continued

```
            <KEY>CODE</KEY>
            <VALUE>pens</VALUE>
        </KEYVALUE>
        <KEYVALUE>
            <KEY>DESCRIPTION</KEY>
            <VALUE>ballpoint pens</VALUE>
        </KEYVALUE>
    </MATRIXATTRIBUTE>
    <MATRIXATTRIBUTE key="Ink Color">
        <KEYVALUE>
            <KEY>SEARCHABLE</KEY>
            <VALUE>true</VALUE>
        </KEYVALUE>
        <KEYVALUE>
            <KEY>CODE</KEY>
            <VALUE>BLK</VALUE>
            <VALUE>GRN</VALUE>
            <VALUE>BLU</VALUE>
            <VALUE>RED</VALUE>
        </KEYVALUE>
        <KEYVALUE>
            <KEY>DESCRIPTION</KEY>
            <VALUE>Black</VALUE>
            <VALUE>Green</VALUE>
            <VALUE>Blue</VALUE>
            <VALUE>Red</VALUE>
        </KEYVALUE>
        <KEYVALUE>
            <KEY>PRICE</KEY>
            <VALUE>0</VALUE>
            <VALUE>0</VALUE>
            <VALUE>0.05</VALUE>
            <VALUE>0</VALUE>
        </KEYVALUE>
    </MATRIXATTRIBUTE>
    <MATRIXATTRIBUTE key="Point Fineness">
        <KEYVALUE>
            <KEY>SEARCHABLE</KEY>
            <VALUE>true</VALUE>
        </KEYVALUE>
        <KEYVALUE>
            <KEY>CODE</KEY>
            <VALUE>FINE</VALUE>
            <VALUE>MEDM</VALUE>
            <VALUE>BOLD</VALUE>
        </KEYVALUE>
        <KEYVALUE>
            <KEY>DESCRIPTION</KEY>
            <VALUE><Fine Point></VALUE>
            <VALUE><Medium Point></VALUE>
            <VALUE>Bold Point</VALUE>
        </KEYVALUE>
        <KEYVALUE>
            <KEY>PRICE</KEY>
            <VALUE>0</VALUE>
            <VALUE>0</VALUE>
            <VALUE>0.23</VALUE>
        </KEYVALUE>
    <KEYVALUE>
        <KEY>Price Formula</KEY>
        <VALUE>Ink Color__PRICE__+Point Fineness__PRICE__</VALUE>
    </KEYVALUE>
    <KEYVALUE>
        <KEY>Part Number Formula</KEY>
        <VALUE>pens__CODE__-Ink Color__CODE__Point Fineness__CODE__-</VALUE>
    </KEYVALUE>
    <KEYVALUE>
        <KEY>Description Formula</KEY>
        <VALUE>pens__DESC__,Ink Color__DESC__, Point Fineness__DESC__,</VALUE>
    </KEYVALUE>
    </MATRIX>
</DATA>
</CATALOG>
```

While the SGSF pen has only two possible configurable features, ink color and point fineness, the same principles can be applied to more complex configurable products as well. The XML document above can be loaded into a catalog in order to preserve the matrix structure of the configurable options. The matrix can be represented in a variety of different ways. In one embodiment, the matrix structure is represented by the XML document and rendered in the catalog as indexed tables. An example of suitable tables is provided, for example, by Tables 4 and 5, above.

Alternatively, the XML document above can be loaded into a catalog that is unable to preserve the matrix structure of the configurable options. To do this, the one pen with its configurable options can first be expanded into the twelve different possibilities as shown in Table 1. The different possible configurations can all be rendered in a new XML document as separate items and then loaded into the catalog. Even though, the catalog does not support the matrix format of the configurable part, the matrix format still provides a tremendous advantage in administration, management, and updating the item.

VI

Table 6 shows a base item number or part number for a particular high intensity discharge industrial lighting fixture. The characteristic defined by each section of the part number is provided and the number of different alternatives for each characteristic. In some cases, the alternative is to either have the feature or not, e.g. special finish or standard finish. In other cases, there are many different options from which to choose. Lamp Wattage can range, for example from 50 to 400 Watts for the fixture. With all of the choices provided, the lighting fixture can be configured in approximately 368 million ways. The matrix required to fully describe the lighting fixture and all its configurations is significantly smaller than what would be required to separately describe all 368 million different item configurations.

TABLE 6

| Base Item No. | Description | No. of Options |
|---|---|---|
| V | Base Section | 1 |
| S | Lamp Type | 3 |
| 0 | Starter Circuit | 4 |
| 15 | Lamp Wattage | 8 |
| H | Ballast Circuit | 2 |
| 12 | Voltage/Frequency | 8 |
| 0 | Ballast Housing Style | 6 |
| TGL | Optical Assembly | 26 |
| P2 | Mounting Style | 16 |
| T | Finish | 2 |
| E1 | Packaging | 6 |
| F | Fusing | 2 |
| N | NEMA Lamp Wattage Decal | 2 |
| C | CSA Certification | 2 |

The present invention can be adapted to accommodate excluded combinations. Suppose, for example that the SGSF pen was available in medium and fine point with green ink but not in a bold point with green ink. Instead of adding complex conditional logic or some other type of coding, this constraint on green ink can be accommodated by rendering the SGSF pen as two different catalog items. The first item is the SGSF pen in black, red or blue ink, available with three different point finenesses. The second pen is the SGSF green pen, available in only two point finenesses, medium and fine.

In the example industrial lighting fixture above, there are some excluded combinations. This reduces the total number of possibilities to approximately 46 million. The three lamp types are high pressure sodium (HPS), metal halide (MH) and mercury vapor (MV) and the eight available lamp wattages are 50, 70, 100, 150, 175, 200, 250, and 400. The six ballast housings come in three types each available with or without stainless steel inserts. The ballast housings, however, are constrained in the amount of heat and power they can support as shown in Table 7.

TABLE 7

| Code | Ballast Housing Style Description | Available Lamps |
|---|---|---|
| 0 | Standard | HPS up to 150 W<br>MH, MV up to 250 W |
| R | Refractor Globe | HPS up to 150 W<br>MH, MV up to 250 W |
| L | Large | HPS 200 W–400 W<br>MH, MV 400 W only |
| S | Standard w/SS Inserts | HPS up to 150 W<br>MH, MV up to 250 W |
| I | Refractor Globe w/SS Inserts | HPS up to 150 W<br>MH, MV up to 250 W |
| M | Large w/SS Inserts | HPS 200 W–400 W<br>MH, MV 400 W only |

As with the pen, the constraints in the housings shown in Table 7 can be accommodated by dividing the lighting fixture into two different items. One item can be configured with the 0, R, S and I ballast housings and with HPS lamp types up to 250W and MH and MV lamp types up to 250W. The other item has only the L and M ballast housings and it can be configured with an HPS type lamp in 200W, 250W and 400W or with an MH or MV lamp at 400W. Rendering the single item as two different items with only certain of the options available allows a very simple matrix to be used for all variations of the product. It avoids complex branch instructions or conditional logic which might otherwise be used. At the same time, the item is still greatly simplified over listing all of the configurations separately. The writing pen and lighting fixture example illustrate how the principles of the present invention can be applied to a wide range of products and services that offer a great variety of configurable or selectable options.

VII

Figure 7:
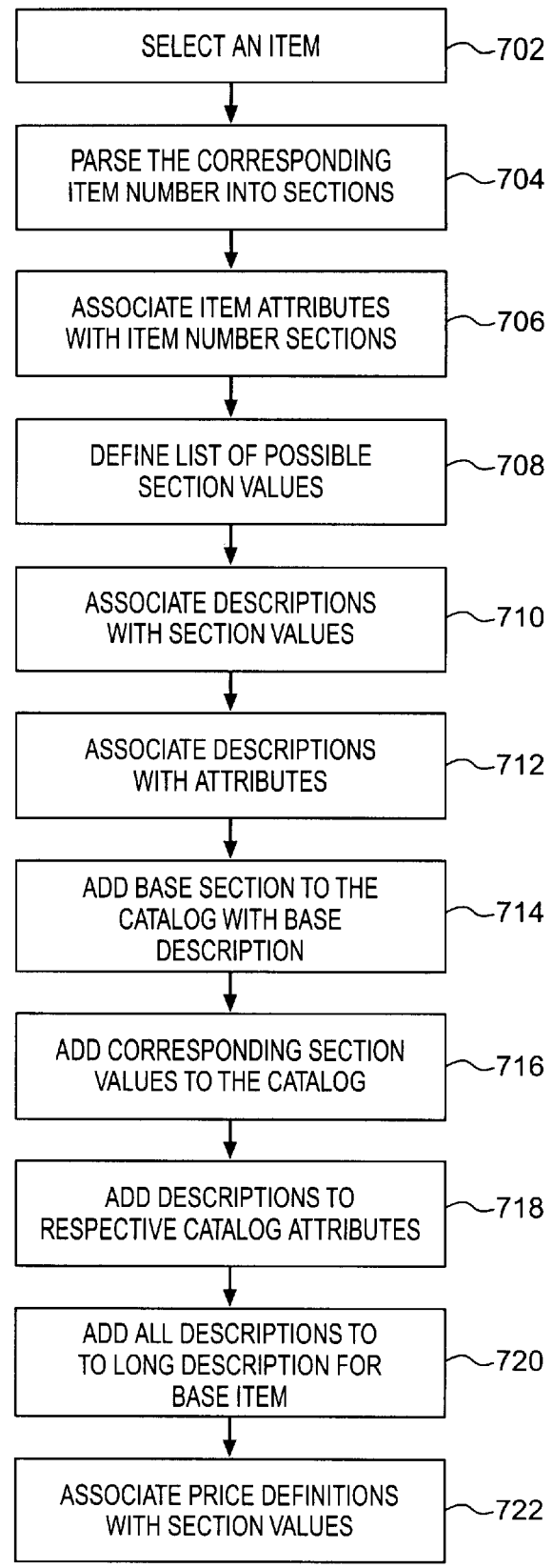
FIG. 7 is a flow diagram of adding a configurable item to an electronic catalog in accordance with the present invention.

FIG. 7 shows a more concise process flow for adding items to an electronic catalog using the part number matrix discussed above. Initially the item that is to be added to the catalog is selected and all of the corresponding information, such as manufacturer part number, price, size, supplier, description, illustration, and any other information is collected and identified 702. The number that is to be used in the item number matrix, such as manufacturer part number, supplier catalog number, or a new unique catalog number is identified. The number is then parsed into sections 704. Each section of the number is then associated with the corresponding item attributes 706. For example, the section of the part number that defines the ink color is associated with the ink color attribute. This can be done in the context of defining a list of possible section values 708. This list contains all the possible values that the particular section of the part number can have depending on the configuration of the product that is selected, as shown in Table 4 and the XML example above. The corresponding descriptions are then associated with the item number section values 710, as can also be seen in Table 4. Then the descriptions can be associated with the attributes 712. The associations can be done using key values as illustrated in the XML document example above. The precise order of these operations is not important to the invention. At this point, the information will be collected and the related values will be associated. Table 4 is an example of a format for the information.

Once the information is collected and related, the item can be added to the catalog. The item will be added as a configurable item. This can be indicated to the catalog by a flag such as the description key shown in the XML document above. The item need not be truly configurable, in that it has interchangeable parts etc. The invention can be applied to any group of items that have enough common characteristics that they can be readily accessed and displayed as a single configurable item. Pens of different colors may share no common components even if the design is the same. Shirts in different sizes normally share no common components except labeling and perhaps buttons. On the other hand, a set of power supplies may share many common components in their various configurations.

The item can be added to the catalog by first adding the base section of the item number to the catalog with the corresponding descriptive information that is common to all configurations of the item, i.e. the base description 714. The corresponding item number section values can then be added to the catalog 716. These are accompanied by the descriptions for each item number section. These can be added only with respect to the corresponding attributes for the item as they exist in the catalog 718. For example, the various colors, black, blue, green and red are added to the ink color attribute for the SGSF item pen.

The descriptions can be added in at least two different ways. In one embodiment, the descriptions for the particular configuration are only available in association with the particular configuration. This can be done when the configurable attribute is not likely to be the subject of a search. If, for example, a pen were available with different cap colors the descriptions of the cap colors might be excluded from the search engine. In this embodiment, a search for "bic pen red" would find the SGSF pen discussed above because the red ink color is available to the search engine. If silver is an available cap color, a search for "bic pen silver" would not find the SGSF pen because the cap color descriptions are not available to the search engine.

In another embodiment, all the descriptive information for all of the different configurations is added to a long description attribute, or some other appropriate attribute for the base item 720. The long description and normally all of the descriptions for each of the attributes are loaded into a search engine in the catalog. After the catalog is loaded, this will allow even the simple search to find the SGSF pen because "red" is a part of the description. In a third embodiment, the descriptive information for all of the configurations is added to both a configuration-specific description and to the base item description. In the XML document above, there is a matrix for each configurable attribute. Each matrix has a searchable key that can be set to true or false. When the key is set to true, the descriptions in that matrix are loaded into a search index to be available to the search engine, when the key is set to false, the descriptions are not loaded and not available. This provides the greatest amount of flexibility. To finish the catalog, any price definitions or other details are associated with the corresponding item number section values 722.

Figure 8:
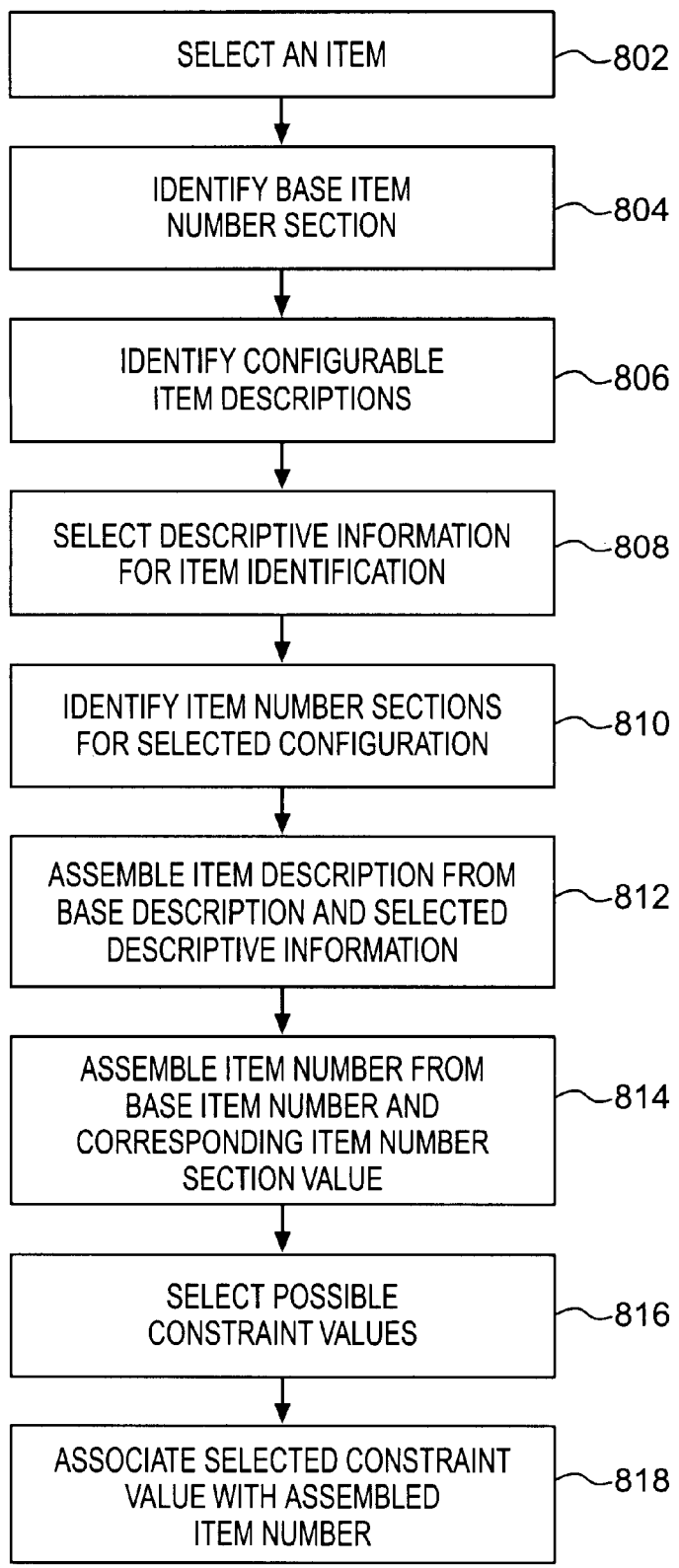
FIG. 8 is a flow diagram of selecting a configurable item from an electronic catalog in accordance with the present invention

The use of the catalog, whether to purchase an item, conduct research, or manage the catalog is shown as a flow chart in FIG. 8. To begin, an item is selected 802. This can be done with a search, a direct query, working through taxonomical lists or in any other way. The base item number section for the selected item is then identified 804. If the process is being performed by a user, the user need not be aware of the base item number or of any of its sections, however, the number is generally needed to link the configurations to a single item and for any type of purchasing or management operations. The description of the configurable item is then identified 806 and can be reviewed. The descriptive information for each of the possible configurations is then presented and selected 808 as shown, for example, in FIG. 5. At this point, the configuration of the item has been selected. If there is more than one aspect of the item that can be configured, for example, ink color and point fineness, then all of the selections are made.

Once the configuration is selected, the values for the corresponding item number sections for the selected configuration can be identified 810. The descriptive information can be assembled into an item description for the selected configuration. This is done using the base description and the selected descriptive information 812. It can also be done using a description formula and inserting the appropriate description values from the part number matrix into the formula. Similarly, the item number for the selected configuration can be assembled from the base item number and the corresponding values for the item number sections 814. A part number formula can be used by inserting the appropriate part number values from the part number matrix into the formula.

If the catalog item offers additional options that are not properly a part of the item number, such as size or voltage mentioned above, then these further options can be handled the same way as the other configurable attributes. The choices of possible option values can be shown and then selected by the user 816. Each option will typically have a code, such as S, M, or L, associated with it. The appropriate code can then be selected and associated with the assembled item number 818.

VIII

The catalog of the present invention is particularly well suited to transport data to other catalogs that operate on independent, incompatible platforms. The matrix structure of the catalog items, as mentioned above, is particularly useful for catalog administration, correction, and updating. When one of the options changes, the item can be updated with a very simple change. For example, if a purple pen were added to the ink color choices for the example SGSF pen mentioned above, the administrator can simple add purple with its code to the ink color list. Three more versions of the pen are then made a part of the catalog, a purple fine, purple medium and purple bold point pen. If green were discontinued, the administrator can simple delete the green option from the available ink colors and all green variations are removed from the catalog. The convenience of this, as compared to administering all the different configurations independently, can be understood more fully by reference to the industrial lighting fixture of Tables 6 and 7. Changing a voltage supply, a ballast item or a housing may affect thousands or millions of different configurations of the lamp. It is much easier to manage the change by changing the one configurable option.

Many catalogs, however, do not support configurable items. The present invention allows these catalogs to be administered using a part number matrix nevertheless. In one embodiment, the configurable items are structured as XML documents, such as the one provided above. This document can be expanded to generate each of the different configurations of the item. In other words, the single configurable item can be converted into multiple items, one for each configuration. Returning to the pen example, the matrix of pens with four colors and three points becomes twelve pens: SGSF-BLK FINE, SGSF-BLK MEDM, SGSF-BLK BOLD, SGSF-BLU FINE, SGSF-BLU MEDM, SGSF-BLU BOLD, SGSF-GRN FINE, SGSF-GRN MEDM, SGSF-GRN BOLD, SGSF-RED FINE, SGSF-RED MEDM, SGSF-RED BOLD, as shown in Table 1. Each of the twelve pen items will contain duplicate information for all of the common information, such as the description tied to the SGSF section of the part number. The part number, description, and price formulas can all be used to generate the twelve items.

The result of the expansion process is a list containing many more items but in which each item is separately listed in a format that can be used on a wider variety of different computing and communications platforms. XML, for example, can be converted to an appropriate proprietary data format and used in many enterprise, inventory and purchasing systems, such as those offered by Oracle Corp., Ariba Inc., and SAP AG. Many such systems include translators or converters to take XML data into the proprietary platform as well as to convert proprietary format data into XML. Once the items are converted from XML, or another easily converted format, into the proprietary format, they can be loaded by the proprietary platform into the system's own catalog or inventory system. The workings of the various different platforms and their respective catalogs vary from one system to the next.

The catalog can therefore easily be expanded and loaded into the proprietary platform's system. Changes can be handled almost as easily. After the catalog with the configurable items has been modified, the modified portions, or the entire catalog, can again be expanded into single items. The single items can be loaded into the proprietary system. The modified items can be written over the older unmodified items using tools within the proprietary platform. Deleted items can be handled by reloading the entire catalog. Other actions can be supported depending upon the various tools made available on the proprietary platform. Using this approach, the catalog can be maintained in one place in one way and published to a great many different systems.

IX

It should be noted that, while the steps described herein may be performed under the control of a programmed processor, such as the processor 202, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to externally supplied attributes of office supplies, the method and apparatus described herein are equally applicable to externally supplied attributes for any other types of electronic catalogs and of any other types of items including documents, and data files. In addition, while the invention has been described in terms of an electronic catalog, other types of ordered information stored in an electronic form can benefit from the present invention.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method for adding an item to an electronic catalog comprising:

identifying a base item;

identifying a part number for the base item;

Breaking the part number into sections, each section. Corresponding to an attribute of the base item;

determining which of the part number sections relate to configurable attributes of the base item;

listing a plurality of selectable part number section values for the configurable attributes;

listing descriptive information for each of the selectable part number section values;

linking the descriptive information to the corresponding selectable part number section value;

generating a part number formula to define the configurable sections and associate configurable sections to the corresponding list of values;

generating a description formula to define a configurable description and associate descriptive information with corresponding configurable selectable part number values;

and adding the base item part number, values list, descriptive information list, part number formula and description formula to an electronic catalog.

2. The method of claim 1, further comprising associating each configurable section with a searchable item attribute for items in the electronic catalog.

3. The method of claim 1, further comprising listing a price factor for each of the part number section values and adding the price factor list to the catalog.

4. The method of claim 1, wherein adding the item comprises adding the item to the catalog as the base item to the catalog and adding the configurable attributes as variations on the base item.

5. The method of claim 1, wherein adding the descriptive information to the respective attributes comprises adding all of the descriptive information to attributes of the base item so that the electronic catalog is searchable against all of the descriptions.

6. The method of claim 1, further comprising defining an item description after adding the item to the catalog, defining an item description comprising:
    finding a base item;
    for each configurable attribute, selecting a descriptive information for the configurable attribute to define a configuration of the item;
    associating a part number section value for each selected descriptive information; and
    combining the associated part number section values to define a part number for the selected configuration of the item.

7. A method of defining an item description using an electronic catalog comprising:
    finding a base item in an electronic catalog;
    retrieving from the electronic catalog a base part number for the base item, the base part number having configurable sections;
    for each configurable section, retrieving from the electronic catalog a list of alternative descriptions for the configurable section; selecting a description from the list of alternative descriptions for each configurable section to define a configuration of the item;
    applying the selected descriptions to identify part number values for each configurable section corresponding to the selected descriptions;
    applying the identified part number values to a part number formula to generate a part number for the defined item configuration; and
    applying the selected descriptions to a description formula to generation a description for the defined item configuration.

8. The method of claim 7 further comprising retrieving a list of price factors for each configurable section, identifying a price factor for each configurable section corresponding to the selected descriptions and applying the identified price factors to a price formula to generate a price for the defined item configuration.

9. The method of claim 7 wherein retrieving a list of alternative descriptions comprises retrieving a list of alternative descriptions from among a plurality of different lists using a key identifying a type of list.

10. The method of claim 9 wherein the key indicates a preferred language for the alternative descriptions.

11. A method of transferring an item having multiple configurations to an electronic catalog, the method comprising:
    maintaining an item in a first data format as a single item having at least one configurable attribute, the configurable attribute being associated with a plurality of alternative values, each value having a corresponding description, wherein the item is represented in the first data format as a matrix of alternative values and alternative descriptions corresponding to the respective values;
    converting the item into a plurality of separate items in the first data format, each item corresponding to a different alternative value of the configurable attribute; and
    loading the separate items into a catalog.

12. The method of claim 11, further comprising converting the plurality of items from the first data format to a second data format before loading the separate items.

13. The method of claim 11, wherein the matrix of values is expressed as text in a mark-up language.

14. The method of claim 11, wherein the plurality of different items comprises all possible configurations of the single item.

15. The method of claim 11, further comprising loading the alternative descriptions into a search index of the catalog.

16. The method of claim 11, wherein converting the item comprises applying a description formula to the descriptions to generate a description for each separate item.

17. The method of claim 11, wherein the first data format further comprises a plurality of alternative price factors, each corresponding to one of the alternative attribute values.

18. The method of claim 17, wherein converting the item comprises applying a price formula to the price factors to generate a price for each separate item.

19. The method of claim 11, wherein the first data format further comprises a plurality of alternative part number values, each corresponding to one of the alternative attribute values and wherein converting the item comprises applying a part number formula to the part number values to generate a part number for each separate item.

20. The method of claim 11, further comprising editing the item in the first data format before converting the item.

21. A method of defining an item description using an electronic catalog comprising:
    finding a base item in an electronic catalog;
    retrieving a base part number from the electronic catalog for the base item, the base part number having configurable sections;
    for each configurable section, retrieving from the electronic catalog a list of alternative descriptions for the configurable section;
    selecting a description from the lists of alternative descriptions for each configurable section to define a configuration of the item;
    applying the selected descriptions to identify part number values for each configurable section corresponding to the selected descriptions;
    applying the identified part number values to a part number formula to generate a part number for the defined item configuration; and
    retrieving a list of price factors for each configurable section, identifying a price factor for each configurable section corresponding to the selected descriptions and applying the identified price factors to a price formula to generate a price for the defined item configuration.

22. The method of claim 21 further comprising applying the selected descriptions to a description formula to generate a description for the defined item configuration.

23. The method of claim 21 wherein retrieving a list of alternative descriptions comprises retrieving a list of alternative descriptions from among a plurality of different lists using a key identifying a type of list.

24. The method of claim 23 wherein the key indicates a preferred language for the alternative descriptions.

25. A method of transferring an item having multiple configurations to an electronic catalog, the method comprising:

maintaining an item in a first data format as a single item having at least one configurable attribute, the configurable attribute being associated with a plurality of alternative values, each value having a corresponding description;

converting the item into a plurality of separate items in the first data format by applying a description formula to the descriptions to generate a description for each separate item, each item corresponding to a different alternative value of the configurable attribute, wherein the first data format further comprises a plurality of alternative part number values, each corresponding to one of the alternative attribute values and wherein converting the item comprises applying a part number formula to the part number values to generate a part number for each separate item; and loading the separate items into a catalog.

26. The method of claim 25, further comprising converting the plurality of items from the first data format to a second data format before loading the separate items.

27. The method of claim 26, wherein the matrix of values is expressed as text in a mark-up language.

28. The method of claim 25, wherein the item is represented in the first data format as a matrix of alternative values and alternative descriptions corresponding to the respective values.

29. The method of claim 25, wherein the plurality of different items comprises all possible configurations of the single item.

30. The method of claim 25, further comprising loading the alternative descriptions into a search index of the catalog.

31. The method of claim 25, wherein the first data converting further comprises a plurality of alternative price factors, each corresponding to one of the alternative attribute values.

32. The method of claim 30, wherein converting the item comprises applying a price formula to the price factors to generate a price for each separate item.

33. The method of claim 25, further comprising editing the item in the first data format before converting the item.

34. A machine-readable medium having stored thereon data representing instructions which, when executed by a machine, cause the machine to perform operations comprising:

identifying a base item;

identifying a part number for the base item;

breaking the part number into sections, each section corresponding to an attribute of the base item;

determining which of the part number sections relate to configurable attributes of the base item;

listing a plurality of selectable part number section values for the configurable attributes;

listing descriptive information for each of the selectable part number section values;

linking the descriptive information to the corresponding selectable part number section value;

generating a part number formula to define the configurable sections and associate configurable sections to the corresponding list of values;

generating a description formula to define a configurable description and associate descriptive information with corresponding configurable selectable part number values; and adding the base item part number, values list, descriptive information list, part number formula and description formula to an electronic catalog.

35. The medium of claim 34, further comprising instructions which, when executed by the machine, cause the machine to perform further operations comprising associating each configurable section with a searchable item attribute for items in the electronic catalog.

36. The medium of claim 34, further comprising instructions which, when executed by the machine, cause the machine to perform further operations comprising listing a price factor for each of the part number section values and adding the price factor list to the catalog.

37. The medium of claim 34, further comprising instructions which, when executed by the machine, cause the machine to perform further operations comprising defining an item description after adding the item to the catalog, defining an item description comprising:

finding a base item;

for each configurable attribute, selecting a descriptive information for the configurable attribute to define a configuration of the item;

associating a part number section value for each selected descriptive information; and combining the associated part number section values to define a part number for the selected configuration of the item.

38. A machine-readable medium having stored thereon data representing instructions which, when executed by a machine, cause the machine to perform operations comprising:

finding a base item in an electronic catalog;

retrieving a base part number from the electronic catalog for the base item, the base part number having configurable sections;

for each configurable section, retrieving from the electronic catalog a list of alternative descriptions for the configurable section;

selecting a description from the lists of alternative descriptions for each configurable section to define a configuration of the item;

applying the selected descriptions to identify part number values for each configurable section corresponding to the selected descriptions;

applying the identified part number values to a part number formula to generate a part number for the defined item configuration; and applying the selected descriptions to a description formula to generate a description for the defined item configuration.

39. The medium of claim 38 further comprising instructions which, when executed by the machine, cause the machine to perform further operations comprising retrieving a list of price factors for each configurable section, identifying a price factor for each configurable section corresponding to the selected descriptions and applying the identified price factors to a price formula to generate a price for the defined item configuration.

40. A machine-readable medium having stored thereon data representing instructions which, when executed by a machine, cause the machine to perform operations comprising:

finding a base item in an electronic catalog;

retrieving a base part number from the electronic catalog for the base item, the base part number having configurable sections;

for each configurable section, retrieving from the electronic catalog a list of alternative descriptions for the configurable section;

selecting a description from the lists of alternative descriptions for each configurable section to define a configuration of the item;

applying the selected descriptions to identify part number values for each configurable section corresponding to the selected descriptions;

applying the identified part number values to a part number formula to generate a part number for the defined item configuration; and retrieving a list of price factors for each configurable section, identifying a price factor for each configurable section corresponding to the selected descriptions and applying the identified price factors to a price formula to generate a price for the defined item configuration.

41. The medium of claim 40 further comprising instructions which, when executed by the machine, cause the machine to perform further operations comprising applying the selected descriptions to a description formula to generate a description for the defined item configuration.

* * * * *

UNITED STATES PATENT AND TRADEMARK OFFICE
CERTIFICATE OF CORRECTION

PATENT NO. : 6,871,198 B2
DATED : March 22, 2005
INVENTOR(S) : Neal et al.

It is certified that error appears in the above-identified patent and that said Letters Patent is hereby corrected as shown below:

Column 10,
Line 58, delete "be+Ink", and insert -- be + Ink --;
Line 59, delete "PRICE+Point", and insert -- PRICE + Point --;

Column 11,
Line 31, delete "ness PRICE+Package Units PRICE", and insert -- ness_PRICE + Package Units_ PRICE --;

Column 22,
Line 50, delete "Breaking", and insert -- breaking --;
Line 50, delete "section.", and insert -- section --;
Line 51, delete "Corresponding", and insert -- corresponding --;
Line 66, delete "ues;", and insert -- ues; and --;

Column 23,
Line 1, delete "and";
Line 39, start a new paragraph beginning with "selecting a description...";
Line 49, delete "generation", and insert -- generate --;

Column 24,
Line 10, start new paragraph beginning with -- loading the separate items... --; and Column 25,
Line 41, delete "converting", and insert -- format --.

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,871,198 B2
DATED : March 22, 2005
INVENTOR(S) : Neal et al.

It is certified that error appears in the above-identified patent and that said Letters Patent is hereby corrected as shown below:

Column 11,
Line 30, delete "ness PRICE+Package Units PRICE", and insert
-- ness_PRICE + Package Units_PRICE --.

Signed and Sealed this

Eleventh Day of October, 2005

JON W. DUDAS
*Director of the United States Patent and Trademark Office*